Figure 1:
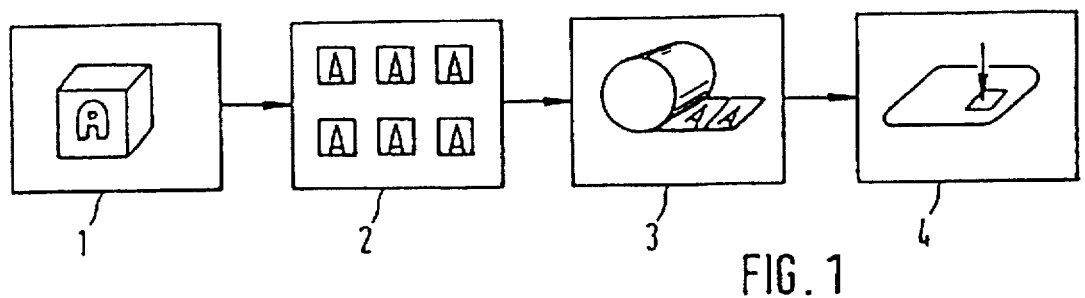

United States Patent [19]

Heckenkamp et al.

[11] Patent Number: 5,801,857
[45] Date of Patent: Sep. 1, 1998

[54] DATA CARRIER HAVING AN OPTICALLY VARIABLE ELEMENT AND METHODS FOR PRODUCING IT

[75] Inventors: Christoph Heckenkamp, Munich; Wittich Kaule, Emmering; Gerhard Stenzel, Munich, all of Germany

[73] Assignee: GAO Gesellschaft für Automation und Organisation mbH, Munich, Germany

[21] Appl. No.: 300,728

[22] Filed: Sep. 2, 1994

Related U.S. Application Data

[63] Continuation of Ser. No. 12,979, Feb. 1, 1993, abandoned, which is a continuation of Ser. No. 590,351, Sep. 28, 1990, abandoned.

[30] Foreign Application Priority Data

Sep. 28, 1989 [DE] Germany .......................... 39 32 505.9

[51] Int. Cl.$^6$ .................. G02B 5/18; G03H 5/18; B42D 15/00
[52] U.S. Cl. ................. 359/2; 359/566; 359/572; 359/3; 283/86; 283/92; 283/94; 283/105
[58] Field of Search ..................... 359/2, 3, 22, 566, 359/572; 283/86, 92, 94, 105

[56] References Cited

U.S. PATENT DOCUMENTS

| | | |
|---|---|---|
| 2,330,718 | 9/1943 | Kallmann ..................... 359/489 |
| 3,532,426 | 10/1970 | Lemmond . |
| 4,014,602 | 3/1977 | Ruell . |
| 4,163,570 | 8/1979 | Greenaway . |
| 4,171,864 | 10/1979 | Jung et al. . |
| 4,184,700 | 1/1980 | Greenaway . |
| 4,211,918 | 7/1980 | Nyfeler et al. . |
| 4,501,439 | 2/1985 | Antes . |
| 4,579,754 | 4/1986 | Maurer . |
| 4,680,458 | 7/1987 | Drexler . |
| 4,680,459 | 7/1987 | Drexler . |
| 4,685,138 | 8/1987 | Antes et al. . |
| 4,728,377 | 3/1988 | Gallagher . |
| 4,856,857 | 8/1989 | Takeuchi et al. . |
| 4,894,110 | 1/1990 | Lass et al. . |
| 4,984,824 | 1/1991 | Antes et al. . |
| 5,044,707 | 9/1991 | Mallik . |

FOREIGN PATENT DOCUMENTS

| | | |
|---|---|---|
| 616470 | of 1989 | Australia . |
| 334117 | 12/1976 | Austria . |
| 2545799 | 4/1977 | Germany . |
| 1541917 | 1/1976 | United Kingdom . |
| 2136352 | 9/1984 | United Kingdom . |
| WO 82/01595 | 5/1982 | WIPO . |

*Primary Examiner*—Jon W. Henry
*Attorney, Agent, or Firm*—Andrus, Sceales, Starke & Sawall

[57] ABSTRACT

The invention relates to a system comprising a series of data carriers, in particular identity cards, papers of value or the like, whereby the data carriers belonging to the system exhibit diffraction structures containing standard information and parts of the series are changed by additional measures in the area of the diffraction structures or combined with other elements and they differ from the rest of the series in optically recognizable fashion, whereby the change in the diffraction structures and/or the combination with other elements convey an esthetic overall impression and the change and/or combination with the other elements cannot be undone without destruction of the diffraction structures.

40 Claims, 9 Drawing Sheets

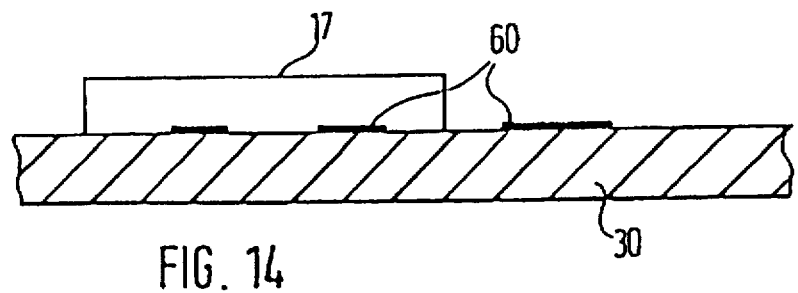
FIG. 14
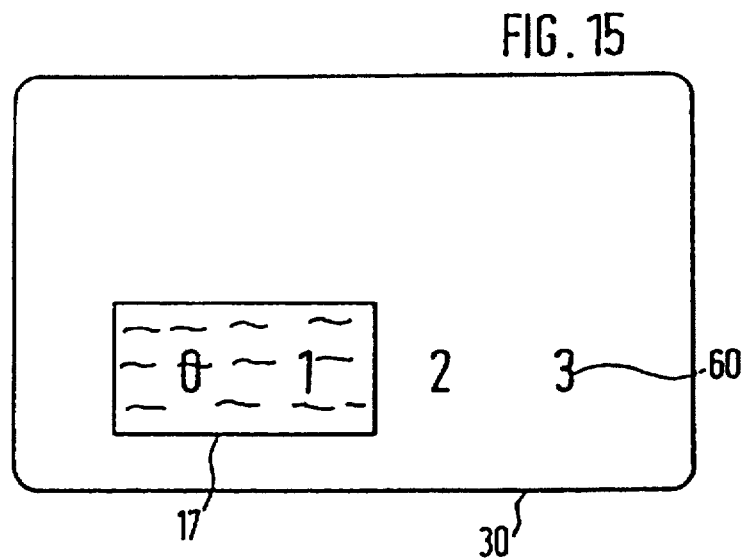
FIG. 15
FIG. 16
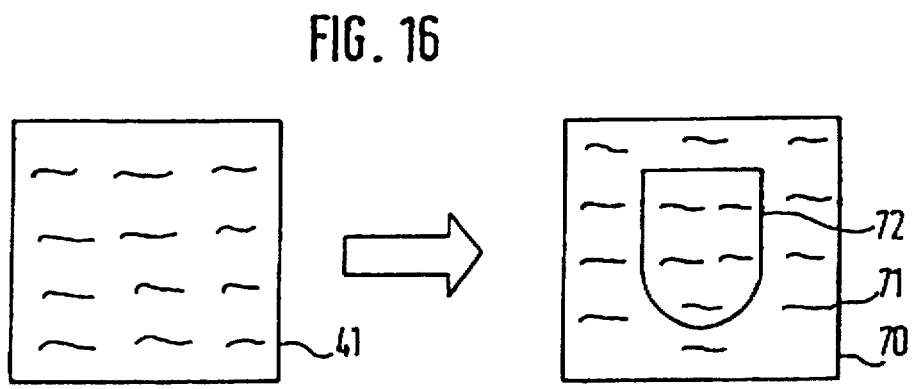

DATA CARRIER HAVING AN OPTICALLY VARIABLE ELEMENT AND METHODS FOR PRODUCING IT

This is a continuation application of U.S. patent application Ser. No. 08/012,979, filed Feb. 1, 1993, now abandoned, which application is a continuation application of U.S. patent application Ser. No. 07/590,351, filed Sep. 28, 1990, now abandoned.

The present invention relates to a system comprising a series of data carriers, in particular identity cards, papers of value or the like, whereby the data carriers belonging to the system exhibit diffraction structures containing standard information, to such data carriers and to methods for producing them.

Optically variable elements have been known in various embodiments for some decades. These elements have in common that they show different optical effects depending on the angles of viewing and illumination. One particular class of optically variable elements is based on diffractive effects. It includes linear or structured diffraction grids, holographic recordings, cinegrams and the like.

Optically variable elements are employed in a great variety of areas, e.g. in advertising, decorating, but also for marking the authenticity of data carriers. Due to their optical quality that has considerably increased in the past while, holograms, cinegrams, diffraction grids, etc., are being increasingly used in the security field, for example for credit cards, identity cards, bank notes, security documents, etc. The rise in popularity is essentially due to two circumstances. Firstly, such elements meet the traditional security requirements for humanly testable authenticity features, i.e. high expenditure for production and imitation, poor availability of the technology and unambiguous testability without additional aids. Secondly, the elements are based on the newest state of the art so that they give the corresponding product a modern, high-tech character.

In the patent literature and in their practical application in the security field, such elements have become known up to now in various versions.

Very soon after the appearance of the first holograms the proposal was made to protect identity cards, credit cards and the like from imitation and falsification by storing the card user's personal data not only in the customary photographic and/or written form but also holographically in a hologram on the card. A comparison between the conventional card data and the data stored in the hologram was intended to prove their correctness. Of the many relevant publications, German "offenlegungsschrifts" nos. 25 01 604, 25 12 550 and 25 45 799 are stated by way of example.

Although the traditional security philosophy requires the expenditure for producing authenticity features to be high, this holds primarily for the original value and the poor availability of the necessary production equipment. The production of the authenticity features themselves, which are to be produced in large amounts, should nevertheless be economical on this relatively expensive production equipment.

With various types of hologram, the preparation of the first hologram is relatively troublesome and expensive. However, it is possible to produce duplicates at a fraction of this "first cost."

Such embodiments thus prove to be disadvantageous not only because the holograms must be produced on very expensive technical equipment but also because separate holograms with individual information (personalization data) must be produced for each card, so that the technical effort for preparing these individual holograms (unicates) is always relatively high. The cost can be reduced only minimally by shifting the effort to the production apparatus. Due to these detrimental marginal conditions the use of holograms with holographically stored card-specific data is unreasonable from a financial point of view.

Different techniques are used depending on the type of data carrier or of holographic standard element. Without laying any claim to completeness one can state the following:

- directly embossing the hologram structure on the recording medium which has a suitable surface quality, e.g. on plastics materials,
- heat-sealing or gluing a hologram provided on an intermediate carrier onto the recording medium itself, which may have a paper or plastics surface, e.g. bank note, paper of value, identity card, etc.,
- laminating or mounting a hologram provided on an intermediate carrier into the interior of a multilayer recording medium,
- embedding safeguarding threads or planchets with holographic diffraction structures in paper during the paper production process.

The process most frequently used today for producing and applying standard holograms to data carriers is the transfer of embossed holograms to identity cards. For this reason the production process and the individualizing measures shall be presented by way of example with reference to this technology. The essential method steps are the preparation of a master hologram, the production of hologram copies and the application to the subsequent product.

The master is generally prepared by manual single-piece production with very expensive equipment. The master hologram therefore involves high cost. The copies can be produced and applied to the cover foils of the cards automatically at high speed and thus at relatively low cost. Due to this cost structure one endeavors to minimize the fixed cost per hologram by preparing a maximum number of identical copies. The necessity of mass production thus leads in the security field, in particular in the card branch, to restrictions with respect to the holographic protection against forgery.

To reduce the cost of producing the hologram, embodiments have become known in which holograms are used as an authenticity feature but the data stored in the hologram are not individualized for the user but merely exhibit an individuality relating to the card issuer (standard holograms). The holograms of different card systems differ from each other, but the holograms of the individual cards of a system are identical.

By using standard holograms (i.e. duplicates of a master hologram) for a card system it now became possible to distribute the relatively high fixed cost for the holographic recording technique over a high number of cards. Depending on the extent of the card series, the cost may thus be distributed over such high piece numbers that virtually only the duplication cost shows in the books for the price of the individual hologram. This fact made holograms economically feasible as mass-produced articles in the security field for the first time.

Along with the well-known applications in the Eurocheck system and for VISA and Mastercard credit cards, examples of these various applications are German "offenlegungsschrift" no. 33 08 831 and European patent no. 0 064 067.

The holograms used in current credit card systems are known to be so-called "embossed holograms," which allow for reproduction by means of die-plates. Although a major part of the production cost arises for the holographic recording technique, the cost to be calculated for reproducing the holograms in series production is still so high that an economical production is only possible if the necessary cost for the recording technique and the production of the hologram master can be apportioned among series with many millions of pieces. The production of small lots, i.e. a few ten thousands to one hundred thousand cards, is usually still impossible for financial or economic reasons.

When using like holograms within a card series one can make cards of one system differ better from cards of another; but the falsification of cards is not fully excluded since such holograms can still be punched out and transferred to other cards. Measures exist for making such manipulation more difficult by shifting the embossed data relating to the card user partly or completely to the hologram area. But it is well-known that the embossed data can be reembossed, whereby such manipulation is recognizable in practice only for experts, and not for laymen. The provision of card-specific embossed data in the area of the standard hologram thus fails to offer genuine protection from a transferral to other cards.

To avoid such problems Austrian patent no. 334 117 describes the application of standard holograms to the user-related individualization of cards. According to this proposal the card individualization is permitted by the combination of several standard holograms each containing certain information of its own, e.g. letters or numbers, and representing different data, such as words, multidigit numbers, etc., through a corresponding combination on the individual cards of a system. By embossing such holograms with the aid of a standard set of press dies one obtains a simple and inexpensive production of individual holographic card data.

However, since alphanumeric data are mainly applied to this variant and particularly pictorial data cannot be readily reproduced, the overall impression of such holograms is visually not very effective, which is why this form of individualization has not gained much acceptance on the market up to now.

A further variant for individualizing documents using holograms is described in German "offenlegungsschrift" no. 25 55 214. Here, it is proposed that diffraction structures in the form of numerical or alphanumeric characters be applied to a document. A thermoplastic ink is printed in the form of numbers on a paper substrate, whereafter the diffraction structure is embossed with a large-surface die.

However, this variant is unsuitable for multilayer types of hologram, which are particularly preferred for producing data carriers since the diffraction structure is located inside and is thus protected.

The prior art shows that the existing needs in security technology and the feasibility of economically reasonable solutions have not yet found a common denominator.

Assuming this general view and the related prior art, the invention is therefore based on the problem of proposing diffraction-structure elements, and in particular hologram variants and production methods for them, that allow for a degree of individualization of the holograms adapted to the particular security aspects, and thus for maximum protection of the data and documents, while at the same time offering the cost advantages of the series production of standard holograms.

This problem is solved by the feature stated in the preamble of the main claim. Developments are stated in the other independent and dependent claims.

The essence of the invention is that the production of holograms or hologram cards and the like, which always consists of several individual steps, is interrupted in a suitable phase in which the products are modified or personalized by selective individualizing measures without any substantial restriction or obstruction of the series production. Depending on the production step in which the modification is performed, very different hologram embodiments are obtainable in the final product (the hologram card) despite the use of like hologram masters. The spectrum of individualization extends from a subset of like holograms that differ in appearance from the standard hologram, which is of interest for small lots, to a complete personalization by which the standard holograms are refashioned into genuine individual cards.

The production of holograms involves the utilization of a great variety of technologies, such as holographic recording, reproduction to obtain a serial semifinished product, connection or introduction to the data carrier, etc. If the individualizing measures are fit into those method steps in which the hologram production changes over from one technology to the other, these measures can be integrated relatively easily into the sequence of hologram production, usually permitting this without any great intervention in the actual production process and its production equipment.

The basic principle of the invention shall be explained in the following by way of example with reference to embossed holograms which are fabricated as semifinished products on so-called "transfer bands" and transferred to the actual data carriers by the transfer method. This method is particularly well suited for realizing the invention since the various technological areas involving the production of the master holograms, the standard holograms (duplicates), the data carriers to be protected and the hologram transfer to the data carrier are particularly clearly separate from one other. However, it is also possible to use the basic ideas of the invention analogously in employing volume holograms, cinegrams, etc., although not always with the range of variation possible with embossed transfer holograms.

It proves to be particularly advantageous that the inventively proposed method makes it possible to exploit all economic advantages of the industrial scale production of holograms both for singly individualized holograms and for small lots of like holograms. At the same time the integration of the individualizing measures into the production process allows the individualization to be of irreversible design. Depending on the type of intervention in the production sequence and the combination of various individualizing measures, one can prepare a great variety of elements starting with the same master. Finally, the stated methods allow for standardized semifinished products to be produced in advance and later individualized and/or finished in the subsequent method steps in accordance with the case of application.

Further advantages and features of the invention can be found in the figures and the following exemplary embodiments.

Figure 2:
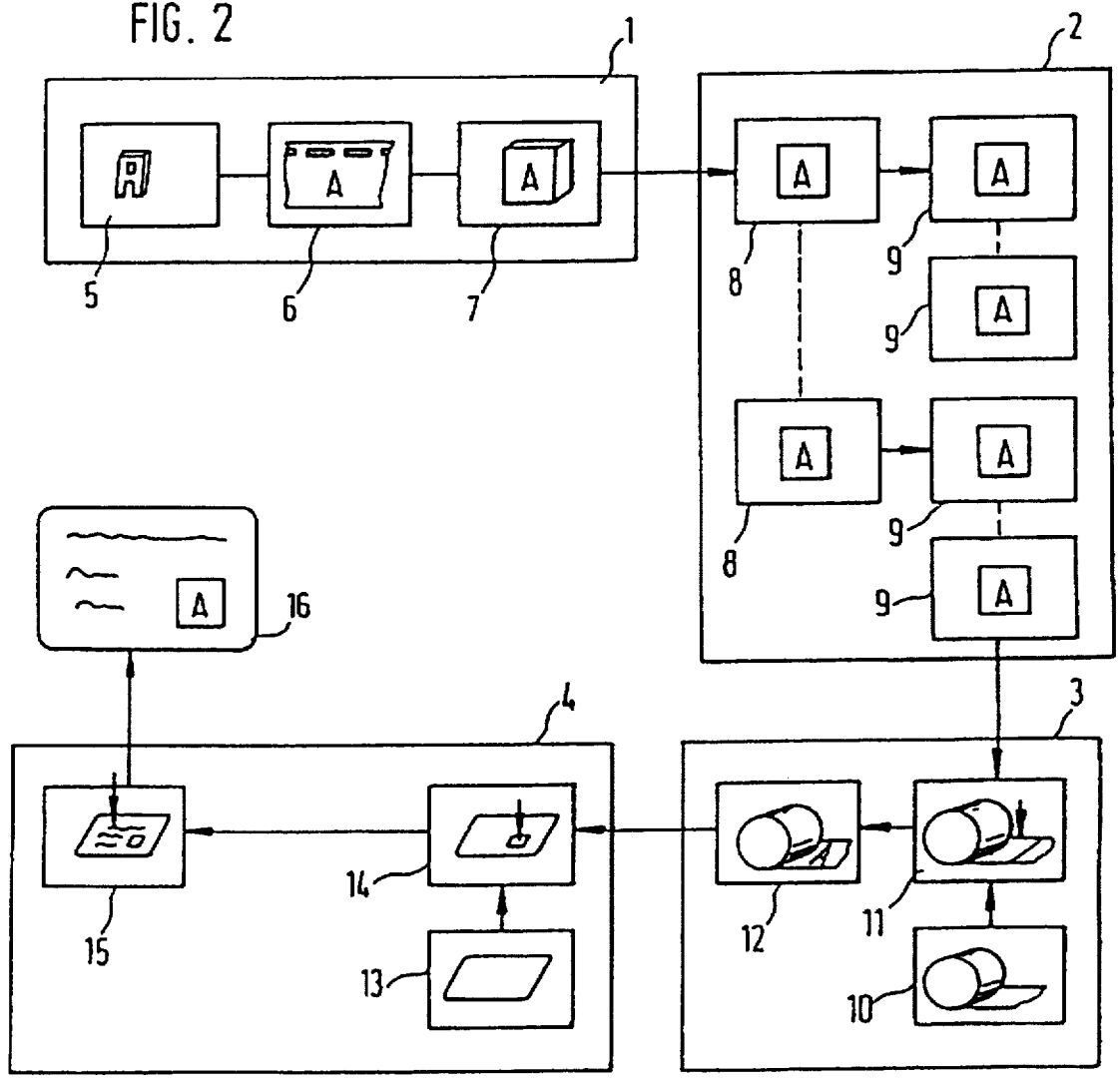
Figure 3:
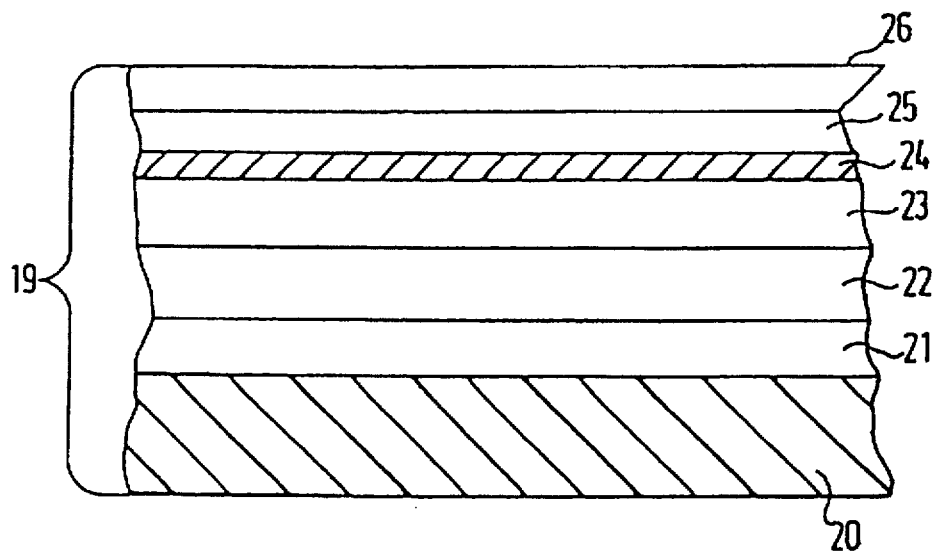
Figure 4:
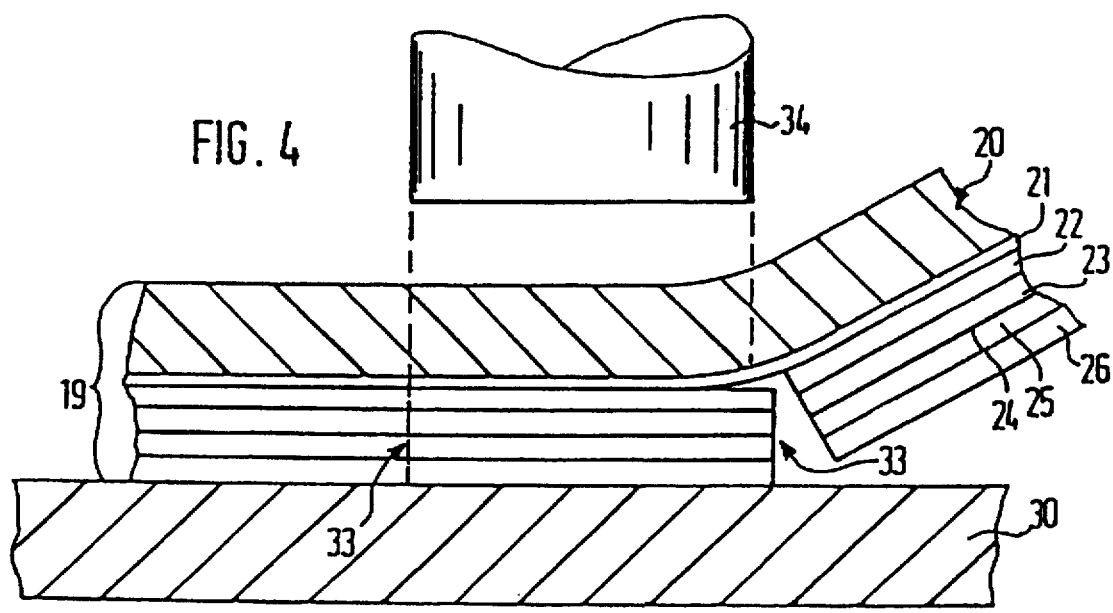
Figure 5:
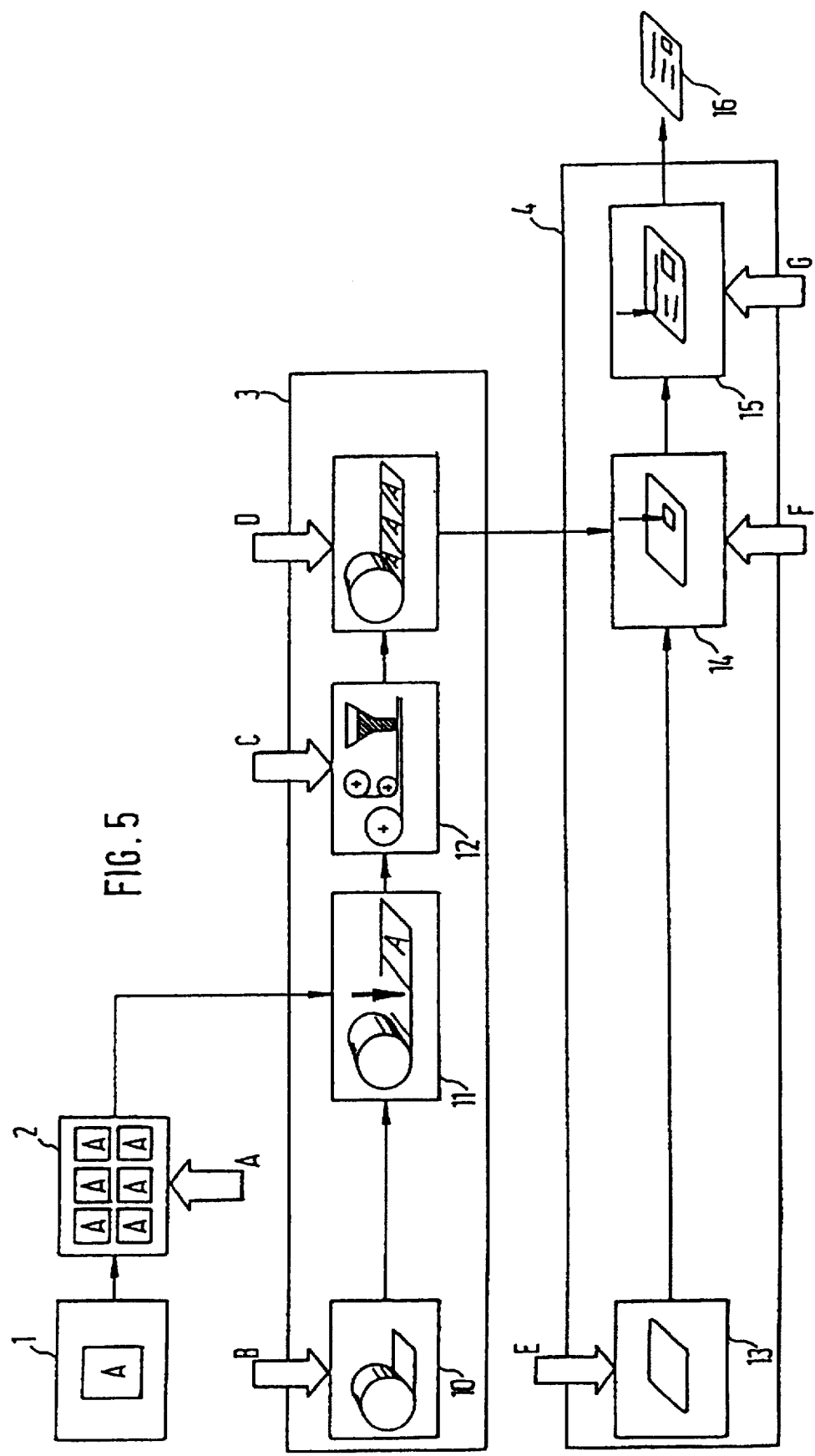
Figure 24:
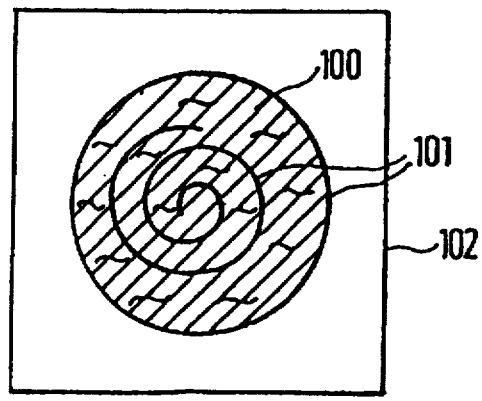
Figure 25:
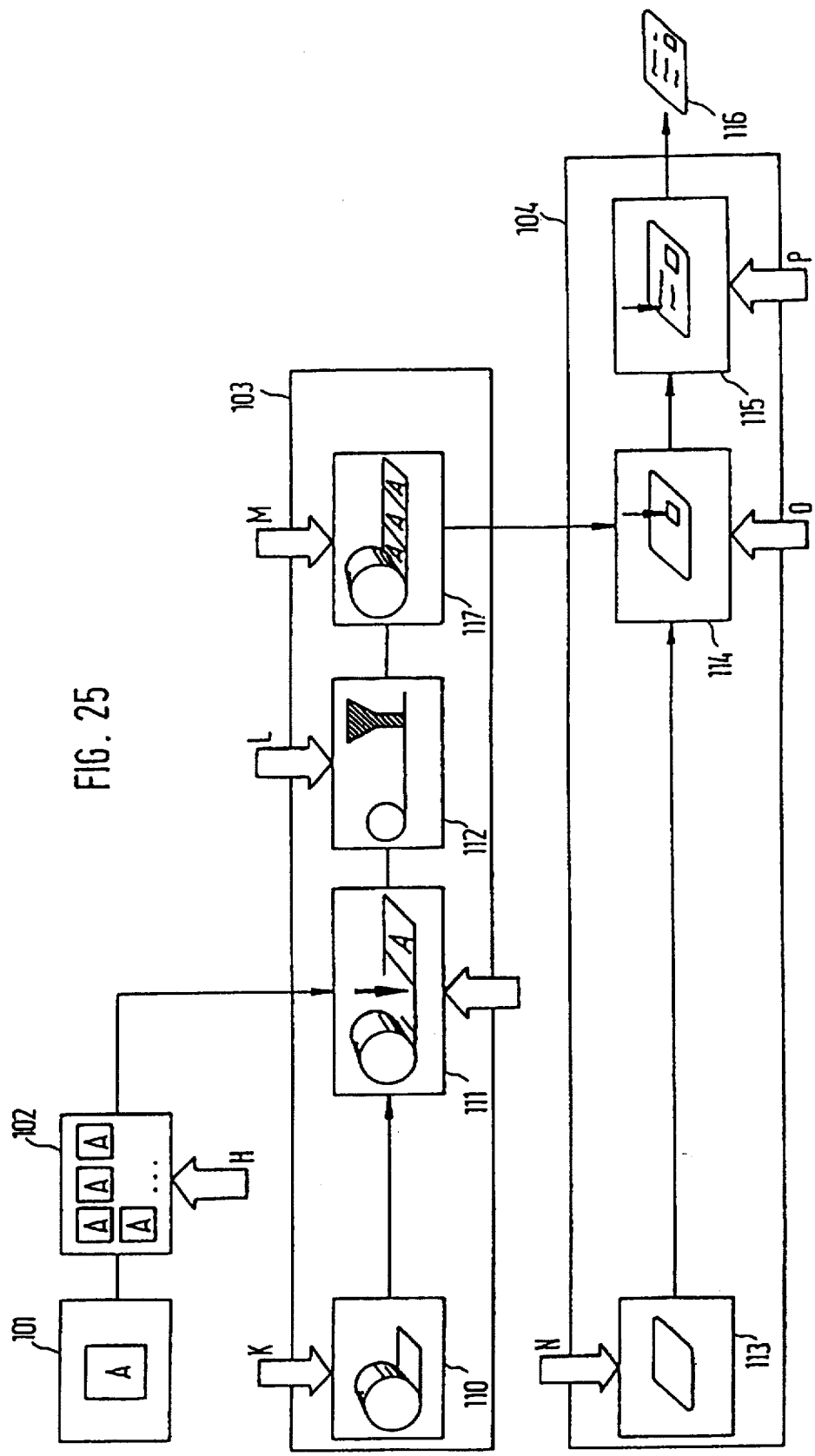

FIG. 1 shows the essential method steps during production and transfer of embossed holograms to data carriers, FIG. 2 shows the subdivision of the method sections shown in FIG. 1, FIG. 3 shows the layer structure of a transfer band, FIG. 4 shows the layer structure of a finished hologram on a substrate, FIG. 5 shows the production sequence in producing embossed holograms and transferring them to data carriers, FIGS. 6–24 show various embodiments of individualized holograms, and FIG. 25 shows the production sequence in producing volume film holograms.

Method for producing transferred embossed holograms

FIG. 1 shows the essential stages in the preparation of embossed holograms and their application to data carriers by the transfer method, as are customary in the current technical state of the art. The method is thus divided into preparation of an embossing master (Pos. 1, FIG. 1),
molding of identical die-plates (Pos. 2, FIG. 1),
embossing the holograms on transfer bands (Pos. 3, FIG. 1), and
transferring the holograms to the product (Pos. 4, FIG. 1).

The individual method steps are obviously so different from each other technologically that they take place in completely different production areas. Due to the complexity of these method steps they are frequently even performed in completely separate industrial factories. The transition from one production area to the other takes place at the technological points of intersection at which the intermediate product exists in the form of a predefined semifinish product.

Each of these four method steps indicated in FIG. 1 has its technological focal points. Thus, in step 1, the preparation of the embossing master, photography or holographic technology is dominant. In this area, that is comparable in structure with a film studio, are the objects to be rendered holographically are produced as models (usually on a 1:1 scale), the film material is exposed holographically, the holograms (films) are copied onto different film material, developed, etc., and the first embossing masters are prepared. On the embossing master the hologram exists in a fine surface relief structure that can be duplicated by mechanical embossing in sufficiently smooth and deformable materials. Since when a relief structure is embossed the relief is subject to high mechanical loads and thus also high wear, one customarily reproduces the holograms using not the embossing master itself, but die-plates derived from it. Since the molding of die-plates from an original (embossing master) is also only repeatable within limits, they are prepared in multistage methods via so-called "submasters" or "sub-submasters," etc.

The die-plates are customarily molded from the embossing master, the submaster or the like in galvano-plastic fashion. The necessary method steps for this are well-known and need not be described here in any detail. The only fact worth mentioning in this context is that the production conditions required for this second production step (Pos. 2, FIG. 1) are equivalent to those in the chemical industry. The production equipment used in this method step consists primarily of galvanic baths in which metal layers are produced, to render the master relief, in suitable electrolytic solutions of metallic salts and chemical additives under the action of electrical direct current.

When the die-plates exist they are used in the third method step (Pos. 3, FIG. 1) in embossing machines to transfer the relief to plastics surfaces, etc. In a variant preferred for the inventive method the relief structures are embossed into standardized "transfer bands" that can in turn be put in intermediate storage as semifinished products and used in a great variety of ways on the subsequent "products."

It is fundamentally possible to apply the holographic relief to the product in one- or two-step methods. In one-step methods the relief structure of the hologram is embossed directly onto the surface of the product to be equipped with the hologram. Depending on the quality of the product this procedure is impossible in many cases, however, since embossing can only be performed on smooth deformable surfaces under the action of high surface pressure. For this reason, but also due to the higher flexibility, one thus generally selects the two-step method in practice, by which the relief is first produced on an intermediate medium, e.g. a transfer band, and glued, sealed or similarly fixed to the product in this form. Although the inventive principle can be used in both versions, the two-step variant is preferred since this embodiment permits a greater range of variation. This holds in particular when a transfer band is used as the intermediate medium.

The transfer bands are likewise produced in several individual steps depending on the required structure or the desired hologram quality and security standard. In this process multilayer neutral foil strips are prepared into which the holograms are embossed set up in a line. The embossed strips are then given an additional coating to protect the fine relief structure from mechanical damage, but also from any manipulation. This third method step (Pos. 3, FIG. 1) involves elaborate and complex mechanical production machines due to the required quality and the fineness of the structures to be produced. The technical equipment used in this method step corresponds essentially to that customary in fine mechanics and in printing and plastics technology.

In the fourth step (Pos. 4, FIG. 1) the finished hologram is transferred from the transfer band to the subsequent product. In the present case the product is preferably an identity card, paper of value, bank note, etc. However, it is also useful and conceivable to transfer the hologram to video tape cassettes, phonographic records, labels in the clothing industry, etc. The transfer of the hologram is performed in highly automated production equipment, as in the third method step. But in contrast to step three (Pos. 3, FIG. 1) the product-specific aspects, e.g. those of paper of value or card technology, must also be included here. In order to prevent the transfer from impairing the quality of the hologram and/or product, the particular interacting parameters of the two elements, such as e.g. properties of the material, processing temperatures, mechanical stability under load, etc., must be accordingly taken into consideration or coordinated with each other. Different products can thus necessitate very different measures for applying the holograms. The transfer of the holograms is generally performed either by the product manufacturer itself or by contractors which produce the packaging, labels or the like for the product.

The method blocks shown in FIG. 1 shall be explained in more detail in the following with reference to FIG. 2.

Production of the embossing master

A three-dimensional model is generally prepared from the object to be shown later, whereby the model must be on a 1:1 scale for the currently customary holographic techniques. The necessary method step for this is marked by Pos. 5 in FIG. 2. When the model exists, a laser-reconstructible hologram is produced on a silver-coated film in intermediate step 6. This hologram, also referred to as the "primary hologram," is then copied over to a second hologram film by the so-called "rainbow technique" so that the holographic image can also be viewed in white light (without a laser). The photosensor material preferably used in this copying operation is photoresist layers. This measure converts the hologram present in the primary hologram as a halftone structure into a surface relief. The thus produced hologram is customarily referred to as a "secondary hologram." In the last intermediate step 7 of method step 1, the "embossing master" is prepared from the secondary hologram in electrogalvanic fashion, the holographic information existing in the master likewise in the form of a surface relief.

Molding of die-plates

The embossing master produced in intermediate step 7 is an expensive unicate and is generally not used for embossing holograms due to the danger of injury and of wear. Instead, a two- or multistage method is used to mold "submasters" from the master, again in electrogalvanic fashion (intermediate step 8) and from them the actual die-plates (intermediate step 9). Starting with the master the submasters exist as negative reliefs. From the submasters one prepares the actual die-plates as positive reliefs, which are then used to emboss the surface relief into a plastic material. The life of a die-plate is rarely more than 10,000 embossings, so that a considerable number of such die-plates must be produced for large runs.

Preparation of the transfer band

The transfer band has a multilayer structure and comprises at least a carrier layer and an again multilayer embossing layer. The transfer band is produced in several method steps, which are divided in FIG. 2 into a preparatory step 10, hologram embossing step 11 and finishing phase 12.

In preparatory step 10 the carrier band is coated with an embossable material in such a way as to allow for trouble-free separation in the subsequent transfer operation under the action of pressure and heat. In the simplest case this is obtained by providing a layer of wax between the carrier band and the embossable plastics layer. In cases in which the hologram is to be recognizable by reflection, a further metal layer with high reflectivity is provided on or under the embossing layer.

In production step 11 the relief structure is pressed into the embossable plastics coating with the aid of the die-plates produced in intermediate step 9. The thus produced surface relief is then covered with at least one protective layer to protect the relief from mechanical damage. This protective layer should be coordinated with the material of the embossable layer so as to impair the optical properties of the hologram as little as possible. For various reasons that need not be explained here, further layers necessary for protecting the hologram are applied over the first protective layer. The last layer provided is finally a heat-sealing layer to ensure an unproblematic transfer and adhesion of the hologram to the subsequent product.

Transfer to the product

The transfer of the holograms to the product, e.g. cards, papers of value or the like, takes place, as already mentioned, in method step 4. As in the production of the transfer band, a neutral semifinished product is also prepared here in an intermediate step 13. In the case of identity cards this is the finished card blank, in which the printed card inlay is already coated with cover foils and, if necessary, equipped with magnetic stripes, signature stripes and the like. However, the card blanks existing in this form usually do not yet exhibit the personal data of the subsequent card owner.

The hologram is transferred from the transfer band in intermediate step 14, in which the hologram is positioned above the proper area in the card and pressed onto the card with the aid of a hot press die in a so-called "hot stamping machine." When the carrier band is removed the multilayer structure containing the hologram tears precisely on the contour line of the press die, thus coming off the transfer band. The card thus equipped with a hologram is provided in intermediate step 15 with the user-related data, for example by a laser personalization method.

The result of this production method is finished card 16 which, as shown schematically in FIG. 2, is now equipped with a properly placed hologram 17 and data record 18 consisting of user-related and neutral data.

FIG. 3 shows transfer band 19 in cross section. It comprises a carrier band 20 to which a separation layer 21 of wax is applied. Thereabove it has a protective layer 22 and a layer of thermoplastic material 23 which is somewhat less thermosensitive than separation layer 21. Thermoplastic material 23 is covered with a thin, weak metal layer 24 preferably consisting of vacuum metalized aluminum and being at least less than 5,000 angstrom thick. When producing transparent holograms one dispenses with metal layer 24. Layers 20 to 24 are a semifinished product (raw band) into which the relief structure is embossed.

To emboss in the surface relief pattern, one presses a heated die-plate onto metal layer 24. Under the action of heat and pressure, thermoplastic material 23 gives way so that the relief pattern is embossed into aluminum layer 24. A second protective layer 25 and a heat-sealing layer 26 are then applied to metal layer 24. In special variants, layers 25 and 26 are also combined into one layer. The thus produced material is an intermediate product which can likewise be stored and transported easily as a semifinished product.

For application of the hologram to the product, transfer band 19, as shown in FIG. 4, is placed with heat-sealing layer 26 on a substrate 30, for example a card, and pressed onto it. The pressing is performed with a heated transfer die 34 or alternatively with a transfer roll. Under the action of heat and pressure, heat-sealing layer 26 bonds with substrate 30. Simultaneously separation layer 21 melts, allowing for removal of carrier material 20. The bond with substrate 30 and the separation of carrier 20 take place only in the surface areas in which separation layer 21 is heated, i.e. only exactly below transfer die 34. In the other surface areas the layer structure and the carrier material remain firmly interconnected. Since layer structure 22 to 26 tears along the contour edges of transfer die 34 when the carrier film is removed from the substrate, the contour of the thus transferred hologram always corresponds to the contour of the press die, whereby more complicated contour structures can also be realized in this way. The process of heat-sealing is known, however, and is described for example in German "offenlegungsschrift" no. 33 08 831.

Individualizing measures with transferred embossed holograms

FIG. 5 again shows the entire production sequence for producing a hologram and applying it to a data carrier together with possible individualizing measures in a flow chart. In contrast to the view described in FIG. 2, method steps 1 to 4 shown in FIG. 5 as simultaneous production processes, as is customary in practice, whereby essentially only those method steps are referred to which are particularly suitable in the sense of the invention for individualizing the standard hologram. For better comparability, the same positions are marked here by the same position numbers.

The inventive possibilities of intervention for individualizing embossed holograms are shown in FIG. 5 by arrows labeled A to G.

Possibilities of intervention are thus given during production of the die-plates (A), during preparation of the raw band (B), during completion of the transfer band (C), on the finished transfer band (D), during preparation of the substrate (E), during transfer of the hologram to the substrate (F), on the final product (G).

In the following, the various possibilities of intervention A to G shall be explained.

Individualization variant A (during production of the die-plates)

The die-plates are generally produced by galvanic copying of the relief structure. There are various equivalent oneor multistage methods for doing this. In a frequently applied two-step process a hardenable plastics compound, such as for example an epoxy resin, is applied to the surface of the master. After hardening the plastics is separated from the master, resulting in a negative mold of the relief structure. By electroplating a nickellayer is applied to the negative mold. This nickel layer, which is a positive copy of the master, is the basis for the further production of the press die.

Figure 6:
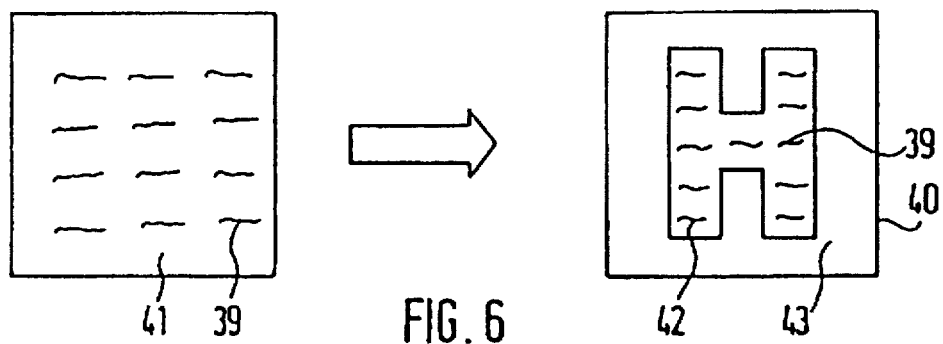

One can give the subsequent holographic image an individual appearance, as shown in FIG. 6, by transferring only selected surface areas of the master during molding. This is done by transferring the subsequent holographic image to the die-plates only in the outline of the area of a letter, a numbering, a company mark or the like, or by pretreating the die-plates in such a way that the relief structure is only formed onto this area of the press die.

There are thus a great number of equivalent approaches for producing the individualized hologram shown in FIG. 6. In a special variant, certain surface areas of the master are covered by means of photolithography. A positive-acting photoresist lacquer is applied for this purpose to the surface of the master. It is then exposed via a mask in which the shape of the letter or company mark is left open. During development of the lacquer the exposed surfaces are laid bare while the unexposed surfaces remain covered. The press die is molded from this individualized master in the known way, whereby the holographic relief structure is transferred only in the surface areas left open.

The example of FIG. 6 shows an embossed hologram 40 finished in this way. In contrast to standard hologram 41, the relief structure or holographic information is present in embossed hologram 40 only in a selected surface area 42, symbolized by the letter H. In remaining surface areas 43 one can see only the unembossed surface of the metal layer, so that the holographic information stands out from altogether reflective surface 40 in area 42 in visually recognizable fashion at certain viewing angles.

The master can also be used repeatedly to produce individualized copies if the covered ranges are laid bare again using suitable solvents and the individualization operation repeated with other masks.

The method can also be applied in the same way to submasters or the die-plates themselves.

For the die-plates, irreversible methods can also be used due to their limited life in contrast to the embossing master. For individualization the relief structures can, for example, be removed or changed in certain areas by chemical or fine mechanical processes. It is also possible to remove or destroy the relief structure selectively using fine mechanical devices.

The die-plates individualized in this way can be used to emboss a few thousand individualized holograms per plate. If greater piece numbers are required, several die-plates must be individualized in identical fashion.

Individualization variant B (during preparation of the raw band)

Figure 7:
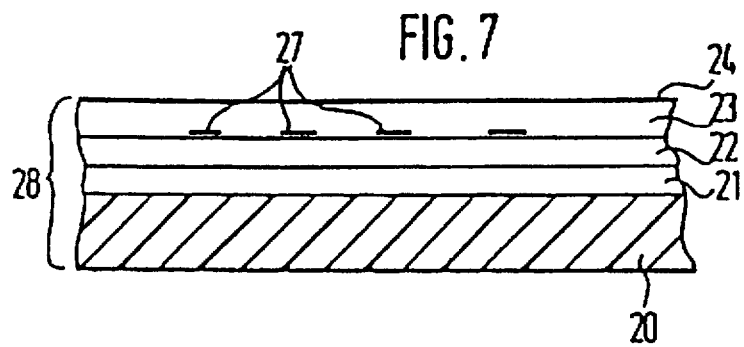

The production of the transfer band takes place in several phases. In the preparatory phase a raw band 28 shown in FIG. 7 is first produced. For this purpose a separation layer 21, then a layer of protective lacquer 22 and finally a thermoplastic layer 23 are applied to a carrier material 20, e.g. a polyester foil. A metal layer 24 is customarily vacuum metalized onto the uppermost layer if the subsequent embossed hologram is to be a reflection hologram. For transmission holograms, metal layer 24 is omitted. The layer structure thus described constitutes raw band 28.

The raw band is individualized by appropriate modification of the layer structure, either by varying the layers themselves, e.g. providing different coloring or changing one or more of these layers, or by selectively introducing additional elements, e.g. printed patterns which are superimposed on the standard hologram in visually recognizable fashion in the final state (on the subsequent product).

For industrial scale production of standard holograms one requires a large number of raw bands. By appropriate modification of the layer structure one can already, without any further technical measures, produce standard holograms that differ very substantially in terms of both their color and their overall impression. These measures can relate either to individual raw bands or to batches of raw bands.

Figure 8:
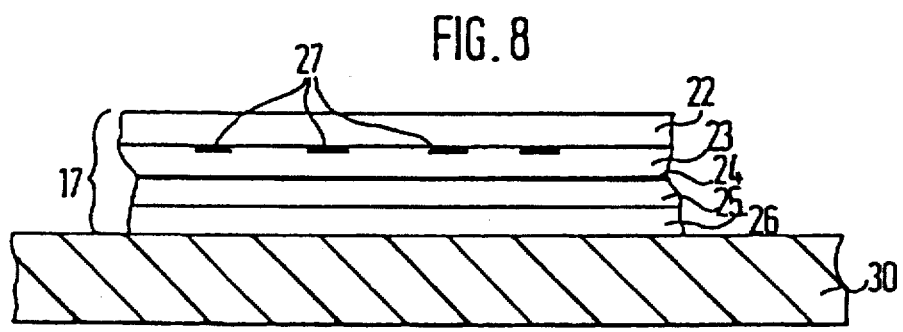

A first variant for individualizing raw bands is to dye the layer of protective lacquer 22 and/or thermoplastic layer 23 individually. Since these two layers later come to lie on the product above the relief structure, as shown in FIG. 8, one preferably uses transparent colors for this purpose. It is thus possible to distinguish such individualized holograms in the finished product, e.g. card 30 (FIG. 8), by their own typical color effect.

In another variant, various metals 24 with different inherent colors are vacuum evaporated on thermoplastic layer 23. Using copper, silver or gold, for example, one can prepare three different-colored types of hologram with these metals. The color of the metal layers can thus be coordinated quite selectively with the overall color impression of the card layout, and used for example to mark cards with different scopes of entitlement.

In a third variant, an individualizing printed pattern is applied to one of layers 22, 23 of the raw band by conventional printing techniques. Suitable printing techniques are offset printing, silk screen printing or other known techniques. For a small-lot individualization the printed pattern can remain unchanged over a certain number of holograms, this printed pattern being preferably coordinated with the holographic image so that it constitutes a border, a central motif or the like for the holographic information in the sense of a graphic composition. The overall impression of such an individualized hologram is thus determined in the final state by the holographic recording and the printed pattern equally.

In a further variant, the printed pattern is equipped with patterns or data that vary from hologram to hologram. An example of this is a continuous numbering, which can be produced using a number printing unit or the like.

If the printed pattern is to appear on the subsequent data carrier in a certain alignment to the hologram, one must make sure the printed pattern and the subsequent hologram are designed so as to register exactly one upon the other. For work in exact register one can use the measures known in printing technology, such as marginal perforation, register marks and the like.

The great number of possible variations include the use of different printing techniques, dyes, inks and metalized layers to produce certain optical impressions and realize special forms of individualization. One must also specially mention in this connection the use of luminescent or phosphorescent substances, which may make special individualizing measures recognizable only in special illumination.

Figure 9:
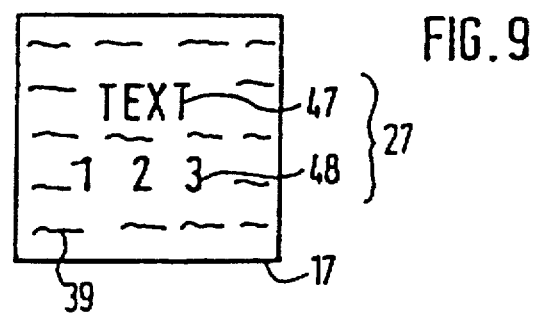

FIGS. 7 to 9 show an embossed hologram 17 that is equipped, as described above, with an individually printed layer of protective lacquer 22. Printed pattern 27 was applied to the surface of layer of protective lacquer 22 and then covered with thermoplastic layer 23 and provided over this layer with a metal layer 24. As already described, the relief structures of the hologram are embossed onto this raw band 28. After further layers 25, 26 are embossed, the production of the transfer band is completed.

FIG. 8 shows such an individualized layer structure as it is disposed on a subsequent product, a card 30. According to this representation, printed pattern 27 is now disposed over metal layer 24 and thus also over the relief structure of the hologram. The normal viewer thus sees printed pattern 27 as printed information independent of the viewing angle that is disposed on a background with metallic luster on which holographic information 29 is recognizable over a large area within a predefined angle range. Printed pattern 27 shown in FIG. 9 has both data 47, which remain the same in the series of the individualized hologram, and data 48, which vary from hologram to hologram.

Individualization variant C (during completion of the transfer band)

In next production phase 11 the holographic relief pattern is embossed under the action of heat and pressure into vacuum metalized layer 24, whereby the embossing and the metalizing can of course be performed in reverse order depending on the production method. In final phase 12 a protective lacquer 25 and an adhesive layer 26 located thereon are applied to the embossed side of the laminar compound. A cross section through finished transfer band 19 is shown in FIG. 3.

For individualization, an individualizing printed pattern can be provided in method step 12 directly on embossed metal layer 24 or on protective layer 25, which is then covered by hot-melt adhesive layer 26. The printing methods and printed patterns can be similar to those in individualization variant B. However, one must make sure that the printing operation does not damage the relief of the hologram present in embossing layer 23, 24.

Figure 10:
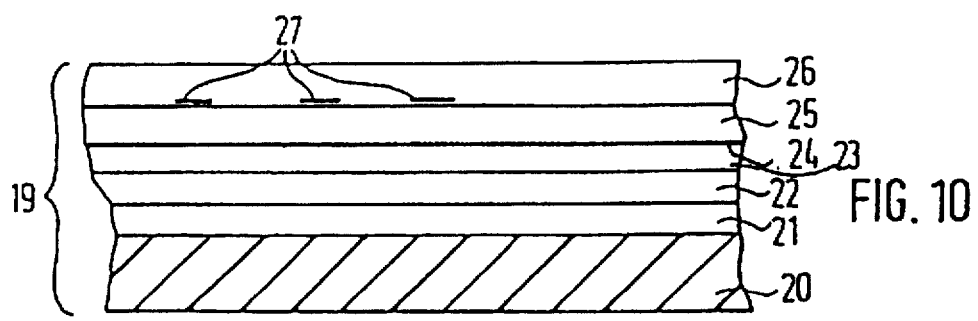

A transfer band produced in this way is shown in FIG. 10, whereby in this embodiment the printed pattern is present between hot-melt adhesive layer 26 and protective layer 25.

Figure 11:
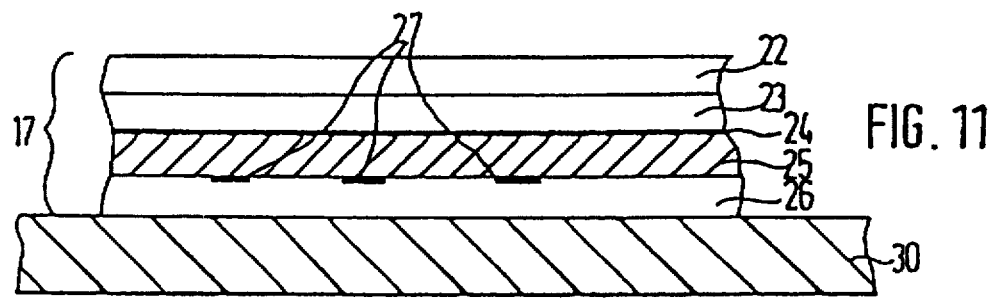

After the hologram has been transferred to the card body, the printed pattern comes to lie between card body 30 and metal layer 24 as apparent from FIG. 11. Since printed pattern 27 is now disposed for the viewer below reflective metal layer 24, special measures are necessary to make this printed pattern recognizable visually or by machine.

It is obviously easiest to make printed patterns applied after relief embossing visible if one dispenses with metal layer 24 in the hologram structure. In this case one speaks of a "transmission hologram," which can also be very useful thanks to corresponding measures, that shall be discussed in connection with individualizing measures E.

Instead of complete omission one can also reduce the layer thickness in the range of a few tens of angstrom to obtain a partial permeability that makes the printed pattern recognizable with sufficient clarity. By using special metals one can achieve an additional color effect since various metals, when they exist in extremely thin layers, exhibit different color effects in incident light and transmitted light.

Alternatively, one can vacuum metalize a dielectric layer instead of a metal layer. Depending on the layer structure, such layers have special spectral properties that can likewise be utilized in transmitted and incident light. Examples taken from the numerous optical forms are partly permeable wide band mirror coatings and spectrally close reflection bands with a play of colors when the viewing angle is changed. In these variants the printed pattern is likewise recognizable only at certain viewing angles. In a further variant, metal layer 24 is designed as a fine screen composed, for example, of metallically reflective and transparent areas located side by side. The transparent areas are preferably given a screen width in the range of 1/10 mm and less, so that the screens cannot be resolved by the eye and appear as a homogeneous partly reflective surface despite their gaps. In this case printed pattern 27 is recognizable at every viewing angle. In cases in which printed pattern 27 is to be utilized solely for automatic detection it is useful, in a further embodiment, to employ dielectric layer structures that act reflectively in the long wave spectral range but are transparent in the short wave range. If the filter edge is set at the boundary between UV light and visible light, the marking remains hidden from the eye but is identifiable for a UV-sensitive detector.

Figure 12:
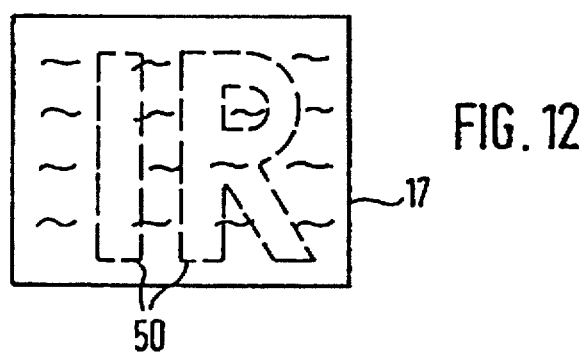

Similarly, one can obtain hologram writing that is readable only in the infrared range if metal layer 24 is designed as an IR-permeable layer. It is covered, for example, by a protective lacquer 25 that appears opaquely black in the visible spectral range and is transparent and partly permeable in the IR range. Printed pattern 27 consists in this case of an IR-reflective color and is located, as described above, between layer of protective lacquer 25 and adhesive layer 26. On the subsequent card the holographic image is clearly recognizable visually against the partly metalized apparently black background. At the same time, IR printed pattern 50 shown by the broken lines in FIG. 12 is readable using suitable sensors.

Depending on the design of the printed pattern, one can also realize here a marking that is unchanged for a predetermined run or varies continuously. If printed pattern 27 is designed as information that is readable in the nonvisible spectral range, it can also be further optimized for these needs if it is designed not as alphanumeric writing, but as machine code, e.g. in the form of a bar code or the like.

A further possibility of individualization by which the form of the hologram is varied is to structure adhesive layer 26 accordingly during completion of the transfer band. The adhesive layer is applied to the laminar compound here in the form of a pattern. During the transfer to substrate 30 only those areas can adhere to substrate 30 which are coated with hot-melt adhesive layer 26 even if the action of pressure and heat through the hot press die covers a large surface. Depending on the shape and surface area of hot-melt adhesive layer 26, only predefined areas of the hologram are thus transferred selectively, possibly even independently of the shape of the press die. This method is a particularly favorable variant of individualization since it is to be provided in the last operation during production of the transfer band and can thus be added in a relatively late stage of the production of the transfer band. Since the transfer band can be put in intermediate storage as a semifinished product without adhesive layer 26, this variant likewise permits transfer bands that are in storage to be individualized in any desired number of units at very short notice.

Individualizing measure D (on the finished transfer band)

After final completion of transfer band 19 shown for example in FIG. 3, there are various other possibilities of individualization. Individualization in this stage of the method is particularly favorable since the transfer band exists in this embodiment as a finished intermediate product, on the one hand, and is protected relatively well from damage by the protective layers present in this stage of the method, on the other hand.

The individualizing measures are based primarily on the inscription of individual data in one or more layers of the transfer band, or on an irreversible transformation or removal of the layer material.

Data can be inscribed using laser inscription. A laser inscriber is used to produce, through carrier sheet 20 or layer of protective lacquer 26, irreversible changes or destruction in the layer structure, such as e.g. a blackening, a destruction of the diffraction structure, a removal of the metal layer, etc.

Depending on their position in the layer structure, the inscribed patterns are directly visible on the finished hologram card or concealed under metal layer 24.

Laser inscription is based on the absorption of the laser radiation by the medium to be inscribed. It has been found that customary reflection holograms are generally very suitable for such inscriptions. In cases in which the laser inscribability does not suffice, which can be the case in particular with transmission holograms, it is possible to improve the inscription quality by adding absorbent colors or additives to one or more layers of the transfer band. In this way one can also sensitize special layers of the transfer band in a particular way so that these layers can be influenced more selectively if the laser energy is dimensioned properly.

At high laser power, the low thickness of the individual layers generally leads to complete vaporization of the material or plasma formation through the total layer structure. In this way one can obtain inscriptions of the transfer band which, regardless of the side to which they are applied, are always clearly recognizable on the finished product and cannot be changed later. This aspect is of special interest in particular if the introduced data are to exist in an unforgeable form.

Figure 13:
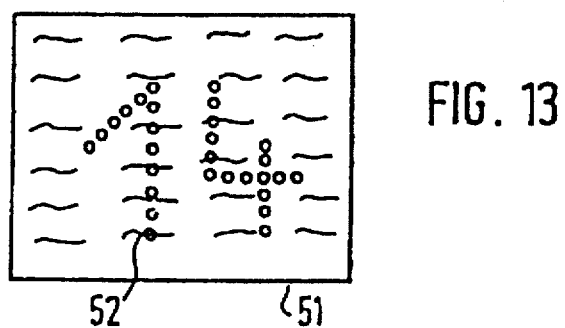

As an alternative to laser inscription there is also the possibility of providing mechanical perforation in the transfer band (FIG. 13). For this purpose the foil in the area of the hologram is furnished with structured perforations using a kind of matrix printer, or with a punched pattern that is produced by a firmly set punching die. For particularly complicated perforations, that may also vary from hologram to hologram, it is also possible to use engraving machines that remove material with the aid of an X-Y controlled graving tool.

The apparatus that can be used for laser inscription or the mechanical removal of material is known to the expert and need not be explained in more detail here.

Individualizing measure E (during preparation of the substrate)

One can obtain further effects by performing selective measures on the substrate which are compatible with the hologram used. For this purpose, markings are applied in the hologram area to the surface of the substrate, which are later covered wholly or partly by the hologram and are recognizable therethrough.

FIGS. 14 to 16 show a first variant of these measures in cross section and in a front view. FIG. 14 accordingly shows a card 30 provided with a printed pattern 60 over which a transfer hologram 17 was disposed. Printed pattern 60 is only partly covered by hologram. 17 so that the information represented by printed pattern 60 is only partly accessible. FIG. 15 shows the card shown in cross section in FIG. 14 in a front view. If a transparent hologram is used, the data disposed under hologram 17 are still equally recognizable, since the hologram is approximately equivalent to a transparent sheet at the viewing angles at which the holographic effect is absent. In spite of their recognizability the data located under hologram 17 are protected from access or manipulation by hologram 17 thereabove. In this way important information of a card can be visually checkable but removed from direct access, whereas less important data remain freely accessible. The data located under the hologram can thus be directly related to those located outside, have the same or a similar information content or relate to completely different matters. The use of a reflection hologram furthermore also prevents visual accessibility, so that data 60 located under hologram 17 can only be checked by machine.

The data carrier may be a great variety of materials, e.g. the inlay of a multilayer card structure, an all-plastic card blank or a packaging element or the like. The individualization variant is particularly effective if the printed pattern is disposed on the substrate in such a way that the hologram to be placed thereabove, as shown in FIG. 14, comes to lie directly above the printed pattern. In this way one obtains not only the possibility of various designs but also a protection of the data located under the hologram, since these data cannot be changed or removed without destruction of the hologram. Such data protection is particularly effective in papers of value, for example, whereby particularly important data of the paper of value can be optically emphasized by their super-position with a hologram, on the one hand, and protected from access, on the other.

Just as in the previous variants, printed pattern 60 can represent a motif, a company mark or the like that remains unchanged through a large number of data carriers, or contain information that varies from data carrier to data carrier, such as continuous numbering. After printing, hologram 17 is placed on the data carrier. Depending on the hologram design, the recognizability of the printed pattern varies. Transparent or partly transparent holograms allow the printed pattern to be recognized visually. IR- or UV-permeable holograms should be provided for hidden inscriptions to be read only by machine. Possibilities for designing partly or fully transparent IR- and/or UV-permeable holograms were already mentioned in the above description and can also be used here.

In a further variant shown in FIG. 16, a background with metallic luster is applied to data carrier 70 in the hologram area as printed pattern 72, which represents a coat of arms in the present case, but may also be a company logo, character or similar mark. On the thus prepared data carrier a hologram is placed that either contains no reflective layer or is equipped with a partly reflective metallic mirror through which the shiny surface remains recognizable. The mark thus supplements the hologram or at least remains visually recognizable through the glued on hologram, whereby printed pattern 72 dominates if transparent holograms are used, and holographic information 71 of standard hologram 70 predominates in terms of the optical impression if semipermeable holograms are used.

Figure 17:
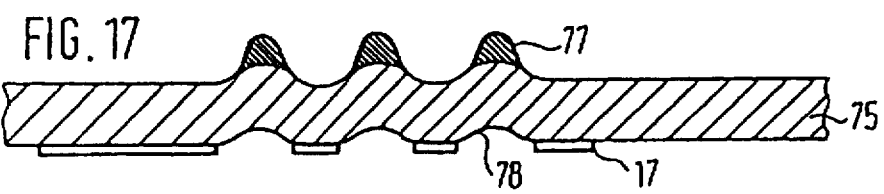
Figure 18:
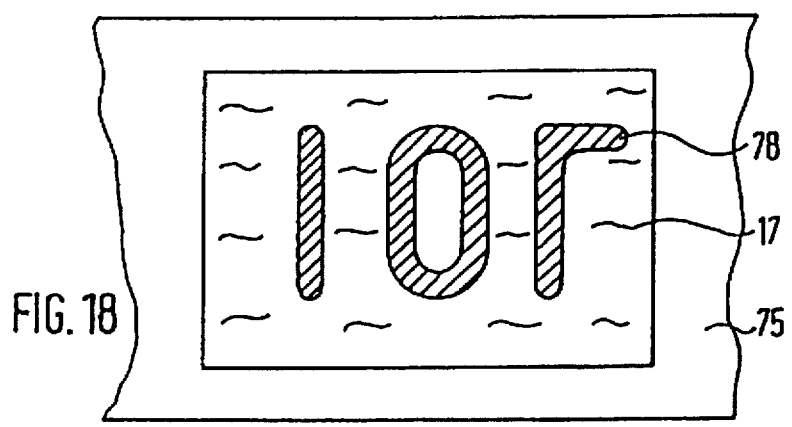

In a further variant, which is shown in FIGS. 17 and 18, standard hologram 17 is used in a paper of value in which it forms a kind of translucent register together with steel intaglio printed information. Paper of value 75 is furnished with a steel intaglio printed pattern 77, that is known to have a positive relief on the ink side and a negative relief 78 on the back congruent to the inking. Hologram 17 is applied to the back of the paper of value in the area of the steel intaglio printing, whereby negative relief 78 is still apparent after the large-surface transfer of the hologram, since the latter has no inherent strength so that adhesion of the hologram was prevented in the area of the depressions. In the surface of hologram 17 the steel intaglio information therefore exists as an interruption of the hologram. In the present case it is possible to compare the identity of printed pattern 77 with recesses 78 both by viewing the front and back of paper of value 75 and in transmitted light, since in this case printed pattern 77 is recognizable through the paper and can be detected congruently in the hologram recesses in the unfalsified original case.

Figure 19:
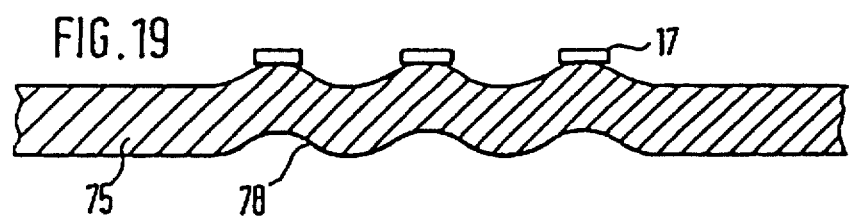

In a variant of the method described in FIGS. 17 and 18, the hologram can of course also be applied to the front of the paper of value, as shown in FIG. 19, whereby in this case only the apexes of the steel intaglio relief are coated with corresponding patches of hologram 17. This measure is particularly effective in combination with a so-called "blinding" or a blind stocking, since in this case inking 77 is omitted and thus only the hologram covers the relief structures.

The variants described in FIGS. 17 to 19 are particularly advantageous since the hologram is always transferred to the relief of the data carrier congruently in a particularly simple way, and such applications (steel intaglio printing or blind stocking) fit particularly well into conventional paper of value designs and can also be integrated particularly easily into the classical production methods.

Individualizing measure P (during transfer of the hologram to the substrate)

In this method step the hologram is transferred from the transfer band to the substrate by means of a heated transfer die. The transfer takes place only below the immediate contact surface of the transfer die. After removal of the transfer die the hologram tears along the edges of the contact surface when the transfer band is removed. The hologram adhering to the substrate thus has the exact contours of the transfer die.

Figure 20:
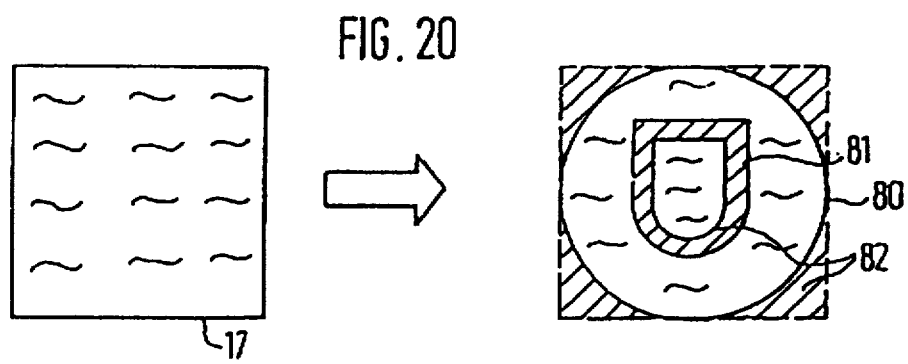

In this method step the holograms can be individualized by selectively varying the contour of the contact surface of the transfer die. The hologram is thus given the same individual contour as the press die. In this way the holograms can be designed in the form of special motifs, company logos, characters and the like. The motifs are to be represented both in the positive print and in the negative print. FIG. 20 shows schematically such an application, whereby original standard hologram 17 was actually transferred by the press die only with the external contour shape of a circle 80, whereby a set of lines 81 is left open inside this circular area in the form of a coat of arms. Shaded surface areas 82 of original standard hologram 17 are disregarded during the transfer.

The expert will understand that this variant makes it possible to transfer almost any piece numbers of individualized holograms by producing only one hot press die. The graphic structures can also be of substantially more elaborate design and can even replace or supplement whole areas or parts of the printed pattern. The transfer dies can be designed in such a way as to represent not only simple pictorial symbols or characters, but also complicated systems of lines or guilloche structures. If skillfully designed, such a "hologram embossing" can be used in as versatile a way as a printing ink. Such an application integrates the hologram into the overall printed pattern less "obtrusively" and can also be used in cases in which large-surface hologram representations were previously not usable for esthetic reasons. When integrating such "holograms structures" one must merely make sure the holographic effect and the holographically rendered details decrease in proportion with the reduction of the hologram surface. Complicated holographic information can thus not be rendered as well in holograms present only in line areas.

In a further variant of these individualizing measures the transfer die is replaced by a matrix hot stamping device. These commercially available devices make it possible to change the shape of the die permanently in the transfer phase, so that contour structures varying from hologram to hologram can also be produced in this method step.

Individualizing measure G (on the final product)

In this method step the hologram transmitted to the substrate is modified by punctiform removal, change or destruction in suitable layers.

A first variant is individualization by inscribing information using a laser pencil. Depending on the laser parameters and the foil structure, various inscription effects can be obtained that are based on the manifold interaction of the laser beam and the hologram structure. In this way one can obtain both unobtrusive material and color changes in the layer structure of the hologram, and the local destruction or complete removal of certain areas of the layer structure of the hologram.

Figure 21:
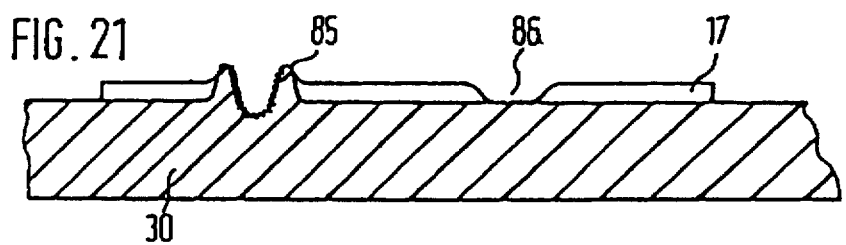

FIG. 21 shows a card body 30 in cross section in connection with two exemplary inscription variants. Hologram 17 is not only totally destroyed by the high energy of the laser beam, but the card substrate is also deformed in such a way that a microrelief 85 exists in this punctiform area. The card substrate is customarily burned locally in such laser inscriptions, so that the inscribed area has a black color ensuring good readability of the thus produced characters. The microrelief provides an additional authenticity criterion that distinguishes original laser inscriptions from other inscription variants.

By correspondingly reducing the laser energy, however, one can also only remove the hologram layers locally, so that in the extreme case the data are formed by recesses 86 in the hologram. In principle, the same technical possibilities are applicable in this individualization measure as are described for measure D. In contrast to individualization on the finished transfer band (measure D), however, the forms of individualization stated here are applied to the finished product, which basically allows for individualization of any hologram. This is especially advantageous in particular when the technical method is employed for the individualizing measures that is also used for providing the personalization data of the card. Precisely for this reason it is particularly recommendable to use a laser inscription system. In principle, however, other methods are also applicable. One must merely make sure the individualizing measures act on the hologram in irreversible fashion so that they cannot be undone.

Combination of individualizing measures

The above-described individualizing measures A to G allow for a hologram individualization in the very different steps of die-plate production, transfer band production and product manufacture, whereby each single measure offers a very great scope of design and has its own characteristic form for the particular method step. Starting with a standard hologram one is thus shown very different ways of making changes for producing very different holograms despite the use of the same embossing master. These holograms in the final product allow not only for individual characterization, but also for the protection of data located on the product.

It is obvious to the expert that individualizing measures A to G can not only be used separately per se, but that any desired combination of individual measures will additionally increase the possibilities of design. By way of example for the great number of possibilities, some variants shall be stated in the following, whereby the reference numbers of the preceding examples have been used wherever possible.

Figure 22:
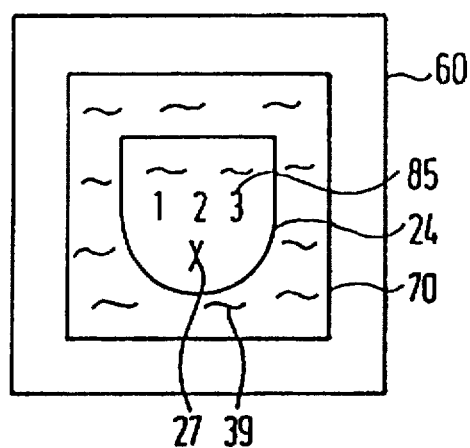

FIG. 22 thus shows an individualized hologram 17 in which holographic information 39 exists across the entire surface of rectangle 70 but reflective metal layer 24 is present only in the form of a coat of arms (individualizing measure B). In the area of the coat of arms there is a printed pattern 27 (measure B) and hologram-specific data 85 inscribed with a laser pencil on the finished product (measure G) The outer protective layer of the hologram is yellow (measure C) so that the coat of arms appears yellow to the viewer. The hologram is applied to a blue area 60 that is printed on the product (measure E).

The described embodiment appears to the viewer in the area of the coat of arms as a yellow tinted hologram that clearly shows the desired holographic effects at certain angles. The hologram areas surrounding the coat of arms appear green (the secondary color from blue and yellow), whereby the holographic information is also recognizable in this area, although less trenchantly. The apparently greenish yellow rectangular hologram field is limited by a blue frame that has no holographic effects but supplements the color of the holographic representation.

Figure 23:
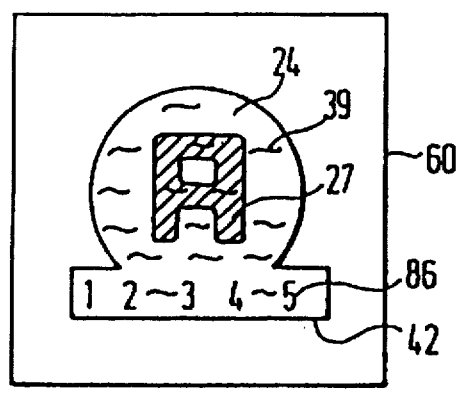

FIG. 23 shows a further embodiment in which an individualized hologram 42 is used that has the contour shape of a circle standing on a rectangular bar. The shape of hologram 42 is embossed by the contour shape of the hot press die (measure F). In the area of the rectangular bar there are numerical data that were produced by means of a laser pencil and exist as recesses in the hologram area (measure G). In the circular area of the hologram a printed pattern 27 is provided in the form of the letter "A," that was provided with light blue ink during the completion of the transfer band (measure C). Silvery metal layer 24 present in the contour is disposed above printed pattern 27 as a semipermeable mirror. The entire layer structure is located on a yellow background print 60 that is provided on the card substrate (measure E).

This hologram structured in its contour appears to the viewer as a silvery surface through which blue printed pattern 27 is recognizable. In a given viewing angle range the holographically stored information, which is also superimposed on printed pattern 27, appears in total surface 42. Only numbers 86 are recognizable in good contrast with the surroundings regardless of the viewing angle. The overall arrangement is framed by the yellow background area.

FIG. 24 shows a further embodiment in which a paper of value is equipped with a translucent element. The paper of value is provided with a printed pattern 101 applied by steel intaglio printing (measure E). On the back of the paper of value a transmission hologram is applied in the circular contour of printed pattern 101, in which the contours of printed pattern 101 are left open (measure F). The hologram itself is designed as a transmission hologram in which no metal layer is provided and the two outer protective layers (layers 22, 23) are colored transparent red (measure C).

For the viewer the translucent element consisting of two parts is recognizable from the front as a steel printed motif 101 and from the back as a red colored hologram with negative contour 101 left open. In transmitted light the two elements supplement each other in such a way that printed pattern 101 on the front fits into the recesses of the hologram without a gap.

Individualization of volume film holograms

As mentioned in the introduction, the inventive individualizing measures are particularly useful for transferred embossed holograms and can be integrated well into the production process. However, the inventive application is not limited to this type of hologram. In the following the utilization of the inventive ideas shall be described in connection with volume film holograms.

The essential stages in the series production of volume holograms include the preparation of a primary hologram,
the reproduction of the holograms by copying,
the application of the holograms to a substrate.

With reference to FIG. 25 the method steps shall be explained in more detail in the following, whereby only the deviations of the two methods will largely be dealt with on the basis of the details stated in FIG. 2 and FIG. 5.

In method step 101 a hologram is recorded from a model on a photosensitive material. This is done by customary technology, superimposing a reference ray with an object ray on a photographic plate. After development and fixation this photographic plate represents the primary hologram.

From the primary hologram, that corresponds to the embossing master, one could now make any number of copies without requiring the intermediate submaster step necessary for the embossed hologram, since the copying of the secondary holograms is a strictly optical process that does not load the primary hologram mechanically.

In particular if large amounts of copies are to be prepared from the primary hologram at different times, however, it is recommendable to avoid damage of every kind, in particular scratches, etc., by preparing secondary holograms from the primary hologram as working specimens, which are then used for the subsequent exposure of the final hologram film in method step 111.

The secondary holograms are prepared by conventional technology in intermediate step 102 in a way that is approximately comparable to the production of the submasters or the die-plates (Pos. 2, FIG. 5) except that no photoresist material is used, but customary hologram films.

In intermediate step 110 the films required for the volume hologram are prepared. Holographic films consist, as is customary in photography, of at least two layers, namely a carrier material, e.g. a polyester film, and a photosensitive emulsion.

In method step 111, a film fabricated in this way is exposed precisely as in method step 102 for producing the hologram to be used on the product. This is done in the known way by employing the original holographic structure that was utilized in exposing the primary hologram, except that the object is now replaced by the hologram film. A conjugated reference ray (reversed in time and direction) is directed onto the secondary hologram. This produces a real image at the original position of the object. With the aid of a second reference ray the virtual image is recorded on the hologram film. By automatically repeating the copying operation one can thus prepare any number of holograms in series production.

After exposure the film is developed and fixed in intermediate step 112. Additional layers, such as a protective layer, adhesive layer, etc., can also be applied.

Intermediate step 117 is provided for any measures on the finished film. It is completely analogous to the processing of the embossed hologram transfer band.

The substrate is prepared in method step 113. These measures are also analogous to the embossed hologram.

In method step 114 the hologram is applied to the substrate. Depending on the substrate and the purpose, there are different possibilities of attachment for fixing the hologram to the substrate. Common techniques in this connection are to glue it onto the substrate or to laminate it into the layer structure of multilayer substrates, such as identity cards. In any case the hologram is punched out of the film and placed on the substrate.

The final product is processed in method step 115. The measures performed here are analogous to the steps necessary for embossed holograms.

Individualizing measures for volume film holograms

The individualizing measures to be used for individualizing volume holograms are likewise very similar to those described in connection with embossed holograms.

First possibilities (measure H) are thus given in method step 102, in which the holographic copy is given an individual appearance by inserting masks or reproduction systems at a suitable place in the beam path, so that the holographic image is accordingly changed or only recorded on the hologram film in selected surface areas. In this way one can give the holographic image a particular contour shape, for example that of a block letter, or leave out such a shape from the holographic image. Since the duplication of the holograms in method step 111 is essentially equivalent to the measures in method step 102, the same or similar measures are also possible in individualization variant L.

During production of the holographic film (intermediate step 110), individualizing measures are possible in analogy to common photography by coloring the carrier material or the emulsion layer with suitable dyes or providing additional dyed layers above or below the carrier material. It is likewise possible to print the film material on one or both sides in this individualization variant K. Since when volume holograms are used the film layer is customarily applied to the subsequent substrate (product) together with the carrier material, it is also conceivable to mark the carrier film correspondingly. An additional individualizing measure when preparing the holographic film is to preexpose the film with suitable picture motifs, such as numbering, a logo or the like.

For individualizing measures L, M, N, P reference is made to the measures described in FIG. 5 due to the analogous possibilities. Due to the different holographic film material, some adaptations might be necessary. If the basic inventive idea is known, these adaptations will be clear to the expert and need therefore not be explained here.

As the expert will also understand, the various individualizing measures H to P can be combined with each other as one pleases to obtain more complex modifications.

Range of application

Individualized holograms have a wide range of application that will be distinguished in the following in terms of how the holograms exist on the subsequent final product. It is common practice to apply holograms to the surface of data carriers. The data carriers can have a paper surface, as do bank notes, identity documents, papers of value and the like, or else a plastics surface, as do identity cards, plastics bank notes, video tape cassettes, etc. In special embodiments the hologram can be limited to certain parts of the product, while in others it covers the entire surface of the product. In the field of identity cards and credit cards these different variants have now become common practice. However, holographic elements can also be embedded in the products. It is thus known to laminate holograms into multilayer plastics cards. The hologram can exist in manifold embodiments, for example as a safeguarding thread, in the form of a logo, an integrated picture motif or the like. It can also be introduced by a kind of mounting technique by which an opening is provided in a foil layer of a multilayer card for the hologram to be glued into.

It is likewise possible to embed holographic elements directly in paper, whereby the holographic material is preferably prepared by being cut into bands, stripes or planchets. These elements should preferably be added during production of the paper, whereby the protection technique is particularly effective if it is present in the paper in the form of a "window safeguarding thread," for example.

Due to the high number of possible variations, the invention gives the expert the possibility of adapting the final product exactly to the technical and/or design-related needs starting with a standard hologram. Although like holographic recordings are used as the starting basis, the invention provides possibilities of giving the final products completely different getups. Along with the large number of possible optical variations, the inventive teaching also takes account of the financial requirements, so that it is possible to adapt the product to almost all requirements.

We claim:

1. A system comprising a series of data carriers which are manufactured and thereafter issued for use, each of the data carriers having a body provided with only a single, multilayer, optically variable element, said optically variable element comprising diffraction structures which are combined with a reflective layer impermeable in the visual spectral range, the diffraction structures presenting visually recognizable information which is identical for all data carriers of the system, the appearance of said information visually changing depending on the angle from which the optically variable element is viewed, the appearance changes comprising an authenticity feature which can be recognized visually by the unaided human eye, each of the data carriers of the system being provided with an alteration in a portion of the optically variable element, the remaining portions of the optically variable element being unaltered so that said unaltered portion and said altered portion may be separately but simultaneously viewed, said alteration comprising the partial removal or destruction of all layers of the optically variable element, said alteration providing an irreversible and visually recognizable change of the optically variable element and the appearance of the information presented by the diffraction structures which can be visually recognized by the unaided human eye, said change being recognizable under all viewing angles of the optically variable element and remaining constant regardless of the angle from which the optically variable element is viewed, said alteration being effected prior to issuance of the data carrier.

2. A data carrier which is manufactured and thereafter issued for use, said data carrier having a body provided with only a single, multilayer, optically variable element comprising diffraction structures combined with a reflective layer impermeable in the visual spectral range, the diffraction structures presenting visually recognizable information, the appearance of which visually changes depending from an angle from which the optically variable element is viewed, the appearance changes comprising an authenticity feature which can be recognized visually by the unaided human eye, the layers of the optically variable element of the data carrier being irreversibly altered in a portion of the optically variable element prior to issuance of the data carrier, the remaining portions of the optically variable element being unaltered so that said unaltered portion and said altered portion may be separately but simultaneously viewed, said alteration comprising the partial removal or destruction of all the layers of the optically variable element, said alteration changing the appearance of the information presented by the diffraction structure of the optically variable element in an irreversible manner which can be visually recognized by the unaided human eye, the alteration being viewable under all viewing angles of the optically viewable element and remaining constant regardless of the angle from which the optically variable element is viewed.

3. The data carrier of claim 2 wherein the partial removal or destruction of said layers of said optically variable element is carried out by means of a laser.

4. The data carrier of claim 2 wherein an adjacent portion of said data carrier body is altered congruently with the partial removal or destruction of said layers of said optically variable element.

5. The data carrier of claim 2 wherein the partial removal or destruction of said layers of said optically variable element is in the form of characters, signs or patterns.

6. The data carrier of claim 2 wherein at least one layer of said element is colored.

7. The data carrier of claim 6 wherein said reflective layer of said element is colored.

8. The data carrier of claim 2 wherein at least one layer of said element comprises a layer of transparent, luminescent dye.

9. The data carrier of claim 2 wherein at least one layer of said element comprises a printed pattern disposed on said reflective layer.

10. The data carrier of claim 4 wherein at least one of the directly adjacent layers of the data carrier is deformed congruently with the partially removed or destroyed layer structure giving rise to a microrelief.

11. The data carrier of claim 2 wherein said alteration comprises a perforation or punching in said layers of the element.

12. A multilayered, optically variable element for a data carrier comprising diffraction structures combined with a reflective layer which is impermeable in the visual spectral range, the diffraction structures providing visually recognizable information, the appearance of which visually changes depending on the angle from which the element is viewed, the appearance change comprising an authenticity feature which can be visually recognized by the unaided human eye, the layers of the optically variable element being irreversibly altered in a portion of the optically variable element, the remaining portions of the optically variable element being unaltered so that said unaltered portion and said altered portion may be separately but simultaneously viewed, said alteration comprising the partial removal or destruction of all layers of the optically variable element, said alteration changing the appearance of the information presented by the diffraction structures of the optically variable element in an irreversible manner which can be visually recognized by the unaided human eye, the alteration being recognized under all viewing angles of the optically variable element and remaining constant regardless of the angle from which the optically variable element is viewed.

13. The element of claim 12 wherein the partial removal or destruction of said layers of said optically variable element is carried out by means of a laser.

14. The element of claim 12, wherein the partial removal or destruction of said layers of said optically variable element is in the form of characters, signs or patterns.

15. The element of claim 12, wherein at least one layer of said element is colored.

16. The element of claim 15, wherein said reflective layer of said element is colored.

17. The element of claim 15, wherein at least one layer of said element comprises a layer of transparent, luminescent dye.

18. The element of claim 12, wherein at least one layer of said element comprises a printed pattern disposed on said reflective layer.

19. The element of claim 12, wherein said alteration comprises a perforation or punching in said layers of said element.

20. A method for producing a series of data carriers comprising the steps of
forming a body for each of the data carriers in the series;
forming a plurality of multilayer optically variable elements each having diffraction structures combined with a reflective layer impermeable in the visual spectral range, the diffraction structures presenting visually recognizable information which is identical for all data carriers in the series, the appearance of said information visually changing depending on the angle from which the optically variable element is viewed, the appearance changes forming an authenticity feature which can be recognized visually by the unaided human eye;
applying only a single, optical variable element to each of the data carrier bodies;
irreversibly removing or destroying all the layers of the optically variable element of each of the data carriers in a portion of the optically variable element so that the appearance of the information being presented by the diffraction structures is irreversibly changed in a manner which can be visually recognized by the unaided human eye, the remaining portions of the optically variable element being unaltered so that said unaltered portion and said altered portion may be separately but simultaneously viewed, said change being recognizable under all viewing angles and remaining constant regardless of the angle from which the optically variable element is viewed; and
issuing the data carriers for use.

21. A method for producing a data carrier comprising one of a series of data carriers, said method comprising the steps of
forming a body for the data carrier;
forming a plurality of multilayer optically variable elements each having diffraction structures, combined with a reflective layer impermeable in the visual spectral range, the diffraction structures presenting visually recognizable information, the appearance of said information visually changing depending on the angle from which the optically variable element is viewed, the appearance changes forming an authenticity feature which can be recognized visually by the unaided human eye;
applying only a single, optical variable element to the data carrier body;
irreversibly removing or destroying all the layers of the optically variable element in a portion of the optically variable element so that the appearance of the information being presented by the diffraction structures is irreversibly changed in a manner which can be visually recognized by the unaided human eye, the remaining portions of the optically variable element being unaltered so that said unaltered portion and said altered portion may be separately but simultaneously viewed, said change being recognizable under all viewing angles and remaining constant regardless of the angle from which the optically variable element is viewed; and
issuing the data carrier for use.

22. The method of claim 21 wherein the step of partially removing or destroying the layers of the optically variable element is further defined as partially removing or destroying the layers by applying energy produced by a laser to the optically variable element.

23. The method of claim 21 wherein the step of partially removing or destroying the layers of the optically variable element is further defined as altering an adjacent portion of the data carrier body congruently with the partial removal or destruction of the layers of the optically variable element.

24. The method of claim 21, wherein the step of partially removing or destroying the layers of the optically variable element is further defined as forming characters, signs, or patterns in the optically variable element.

25. The method of claim 21, wherein the step of forming the optically variable element is further defined as coloring at least one layer of the element.

26. The method of claim 25, wherein the step of forming the optically variable element is further defined as coloring the reflective layer of the element.

27. The method of claim 21, wherein the step of forming the optically variable element is further defined as forming at least one layer of the element as a layer of transparent, luminescent dye.

28. The method of claim 21, wherein the step of forming the optically variable element is further defined as including the steps of forming at least one layer of the element as a printed pattern, and disposing the printed pattern layer on the reflective layer.

29. The method of claim 21, wherein the step of irreversibly altering the optically variable element is further defined as perforating or punching in the layers of the optically variable element.

30. The method of claim 21, wherein the optically variable element is produced as embossed hologram provided on a transfer band, and the alteration is performed on the transfer band.

31. A method for producing an optically variable element for the application to a data carrier comprising the steps of forming a multilayer optically variable element comprising diffraction structures combined with a reflective layer impermeable in the visual spectral range, the diffraction structures presenting visually recognizable information, the appearance of said information visually changing depending on the angle from which the optically variable element is viewed, the appearance change forming an authenticity feature which can be recognized visually by the unaided human eye; and irreversibly removing or destroying all the layers of the optically variable element in a portion of the optically variable element, so that the appearance of the information being presented by the diffraction structures is irreversibly changed in a manner which can be visually recognized by the unaided human eye, the remaining portions of the optically variable element being unaltered so that said unaltered portion and said altered portion may be separately but simultaneously viewed, said change being recognizable under all viewing angles and remaining constant regardless of the angle from which the optically variable element is viewed.

32. A method of claim 31, wherein the optically variable element is produced as embossed hologram provided on a transfer band, and the alteration is performed on the transfer band.

33. The method of claim 31 wherein the step of removing or destroying the layers of the optically variable element is further defined as removing or destroying the layers by applying energy produced by a laser to the optically variable element.

34. The method of claim 31, wherein the step of partially removing or destroying the layers of the optically variable element is further defined as forming characters, signs, or patterns in the optically variable element.

35. The method of claim 31, wherein the step of forming the optically variable element is further defined as coloring at least one layer of the element.

36. The method of claim 35, wherein the step of forming the optically variable element is further defined as coloring the reflective layer of the element.

37. The method of claim 31, wherein the step of forming the optically variable element is further defined as forming at least one layer of the element as a layer of transparent, luminescent dye.

38. The method of claim 31, wherein the step of forming the optically variable element is further defined as including the steps of forming at least one layer of the element as a printed pattern, and disposing the printed pattern layer on the reflective layer.

39. The method of claim 31, wherein the step of irreversibly altering the optically variable element is further defined as perforating or punching in the layers of the optically variable element.

40. The method of claim 23 wherein at least one of the directly adjacent layers of the data carrier is deformed congruently with the partially removed or destroyed layer structure giving rise to a microrelief.

* * * * *